US005295456A

United States Patent [19]
Lawson

[11] Patent Number: 5,295,456
[45] Date of Patent: Mar. 22, 1994

[54] DEODORIZING ADDITIVES FOR ANIMAL LITTERS

[75] Inventor: Frederick W. Lawson, Somerset, N.J.

[73] Assignee: Church & Dwight Co., Inc., Princeton, N.J.

[21] Appl. No.: 56,511

[22] Filed: May 3, 1993

[51] Int. Cl.$^5$ .............................. A01K 1/015
[52] U.S. Cl. ................................. 119/172
[58] Field of Search ................. 119/171, 173

[56] References Cited

U.S. PATENT DOCUMENTS

| | | | |
|---|---|---|---|
| 3,765,371 | 10/1973 | Fisher | 119/1 |
| 4,275,684 | 6/1981 | Kramer et al. | 119/1 |
| 4,315,761 | 2/1982 | Larrson et al. | 71/21 |
| 4,395,357 | 7/1983 | Kramer et al. | 252/428 |
| 4,494,481 | 1/1985 | Rodriguez et al. | 119/1 |
| 4,506,628 | 3/1985 | Stockel | 119/171 |
| 4,570,573 | 2/1986 | Lohman | 119/1 |
| 4,622,920 | 11/1986 | Goss | 119/171 |
| 4,638,763 | 1/1987 | Greenberg | 119/171 |
| 4,685,420 | 8/1987 | Stuart | 119/171 |
| 5,000,115 | 3/1991 | Hughes | 119/173 |

*Primary Examiner*—Thomas Price
*Attorney, Agent, or Firm*—Charles B. Barris

[57] ABSTRACT

There is disclosed a solid particulate deodorizing additive composition for a water-absorbent animal litter comprising sodium bicarbonate (SBC) or potassium bicarbonate (KBC), the particles of which are substantially coated with a mineral oil, mixed with a powdered siliceous material, e.g., expanded perlite, having a bulk density significantly lower than the density of SBC or KBC, the coated particles of SBC or KBC being stably adhered to and agglomerated with the particles of the siliceous material.

13 Claims, No Drawings

DEODORIZING ADDITIVES FOR ANIMAL LITTERS

BACKGROUND OF THE INVENTION

1. Field of the Invention

This invention relates to novel deodorizing additives for animal litters and the litter compositions containing such additives.

2. Information Disclosure Statement including Description of Related Art

The following information is disclosed in accordance with the provisions of 37 CFR 1.56, 1.97 and 1.98.

As is well-known, many species of animals and birds are raised and/or kept by people for various purposes, e.g., as pets; for the production of valuable products such as food or furs; or for experimental purposes. A major problem connected with the raising and/or keeping of animals is the disposition of their waste excretions, mainly urine and feces. Whether the animal or bird is caged, in which case its waste is deposited on the floor of the cage, or allowed to roam free but is trained to deposit its waste in a particular receptacle, a "litter" material is generally employed which is capable of absorbing the liquid portion of waste excretions, primarily urine and the excess liquid of fecal matter. However, while the water absorption properties of most litters make them effective in reducing the mess of animal waste excretions they do little to prevent the foul odor emitted by the waste.

Various deodorizing agents have been recommended for use in animal litters, including sodium bicarbonate (SBC). However, when SBC is utilized in the form of an unmodified powder as a deodorizing agent in animal litter, it tends to "wick" and dissolve in the aqueous phase of any animal waste products present, in which dissolved state it does not exert any deodorizing effect. Furthermore, due to its relatively high density, it tends to sink to the bottom of any litter composition present in the cage or litter box. To overcome these disadvantages, it has been proposed that the SBC be utilized in the animal litter in encapsulated form. However, the preparation of encapsulated SBC is an expensive procedure which renders the employment of SBC in this form impractical for many applications.

The following prior art references illustrate aspects of the technology of animal litter preparation.

U.S. Pat. No. 3,765,371 issued Oct. 16, 1973 to Fisher discloses a foamed plastic for absorbing and/or adsorbing animal waste products.

U.S. Pat. Nos. 4,275,684 issued Jun. 30, 1981 and 4,395,357 issued Jul. 26, 1983 to Kramer et al., disclose calcium silicate as an animal litter box absorbent material.

U.S. Pat. No. 4,315,761 issued Feb. 16, 1982 to Larrson et al., teaches the use of aerated or foamed concrete to absorb animal waste products and facilitate the removal of excrement from a litter box.

U.S. Pat. No. 4,494,481 issued Jan. 22, 1985 to Rodriguez et al., discloses the addition of a soluble salt of a transition metal from Group Ib or IIb of the Periodic Table added to a conventional litter composition to prevent the development of urine odors.

U.S. Pat. No. 4,570,573 issued Feb. 18, 1986 to Lohman, discloses an animal litter composition containing 60-94 wt. % of paper, 1-35 wt. % of gypsum, and 3-12% of water.

U.S. Pat. No. 4,638,763 issued Jan. 27, 1987 to Greenberg, teaches the addition of sodium sulfate to a litter box absorbent material to facilitate removal of solid absorbent material from the litter box.

U.S. Pat. No. 4,685,420 issued Aug. 11, 1987 to Stuart, discloses an animal litter composition comprising a water-absorbing polymer such as a polyacryate combined with a porous inert solid substrate.

U.S. Pat. No. 5,000,115 issued Mar. 19, 1991 to Hughes, discloses the use of a water swellable bentonite clay as an absorbent litter material. The clay absorbs the liquids in animal waste which on contacting the clay agglomerates it into a stable mass easily separated from the unwetted and unsoiled portion of the composition.

Application Ser. No. 08/056,629, filed May 3, 1993, discloses and claims litter compositions containing the deodorizing additive of this invention.

SUMMARY OF THE INVENTION

In accordance with this invention, there is provided as a deodorizing additive for a water-absorbent animal litter, a solid particulate composition comprising sodium bicarbonate (SBC) or potassium bicarbonate (KBC), the particles of which are substantially coated with a mineral oil, blended with a powdered siliceous material, e.g., expanded perlite, having a bulk density significantly lower than the density of SBC or KBC, the coated particles of SBC or KBC being stably adhered to and agglomerated with the particles of the siliceous material.

Since the SBC or KBC particles in the compositions of this invention are largely coated with mineral oil and are agglomerated with the siliceous material, they have little or no tendency to wick and dissolve into the aqueous phase of the animal waste products deposited in the litter. Moreover, the large effect of the mineral oil, due to its capillarity, surface tension and viscosity, in causing the SBC or KBC to adhere to and agglomerate with the lower bulk density siliceous material, results in a reduction of the overall density of the particles containing SBC or KBC in the composition of the invention so that such density is substantially lower than that of the SBC or KBC itself. Thus, there is a much smaller tendency for the particles of the composition of the invention to sink to the bottom of the cage or receptacle containing the litter than there is when pure SBC or KBC is added. The inventive compositions therefore provide means for the SBC or KBC to exert its deodorizing effect while dispersed throughout the litter, even in the presence of a considerable amount of aqueous liquid such as urine.

Due to the necessity for the SBC or KBC in the compositions of this invention to be thoroughly coated with mineral oil and to be efficiently agglomerated with the particles of siliceous material, the method of preparation of the composition is somewhat significant. Thus, in most cases, the pure SBC or KBC must be blended with sufficient mineral oil to substantially coat the particles while still maintaining a powdery consistency, and the powder of coated particles is then blended with a powder of the siliceous material to obtain a powder composition composed of stable agglomerates of coated SBC or KBC and siliceous material.

DETAILED DESCRIPTION OF THE INVENTION

In general any commercial grade of SBC or KBC may be used in preparing the additive compositions of this invention. In general the particles of SBC or KBC may be within the range of about 20 to 400 U.S. mesh size, preferably about 40 to 140 U.S. mesh size, and may have an SBC or KBC purity of at least about 90, preferably at least about 99%. The SBC or KBC is usually present in the final additive composition in an amount of about 80 to 99 wt. %, preferably about 92 to 98 wt. %.

Any conventional and available mineral oil may be used in preparing the compositions of this invention, e.g., those having a density of about 0.830 to 0.905 g/cc. at 15.6° C. and a viscosity of about 3 to 80 centistokes at 40° C. The amount of mineral oil employed is generally in the range of about 0.1 to 2.0 wt. %, preferably about 0.5 to 1.0 wt. % based on the weight of SBC or KBC.

The powdered siliceous material having a bulk density significantly lower than SBC or KBC may be obtained, for example, from a type of glassy igneous rock, e.g., a rhyolitic glasses such as perlite, comprising hydrated silica and containing spheroidal and convoluted concentric cracks causing it to break up into small pear-like masses or pebbles. When this type of material is crushed and "expanded," i.e., heated to a temperature above that at which its water of hydration is liberated, it forms particles of thin spherical or ellipsoidal shells and their fragments and other scaly or flaky siliceous particles which may be used in the compositions of this invention. Expanded perlite is the preferred siliceous material for use in this invention.

Other siliceous materials which may be utilized for the purposes of this invention are the rhyolitic glasses other than perlite and phyllosilicates containing water of hydration, e.g., vermiculite, which have been subjected to expansion. As is the case with perlite, heating these materials to a temperature above that at which their water of hydration is liberated causes them to expand substantially resulting in an appreciable decrease in their bulk density.

The siliceous material, e.g., expanded perlite, utilized in the compositions of the invention may have a bulk density in the range of, for example, 50 to 300 g/l preferably about 70 to 150 g/l and a particle size, for example, of about 20 to 400 U.S. mesh size, preferably about 50 to 200 U.S. mesh size. It may be present in the additive composition in an amount, for example, of about 0.5 to 20 wt. %, preferably about 1 to 5 wt. %, based on the weight of the final additive composition. Within the foregoing ranges, the weight percent of siliceous material in the additive composition may be adjusted such that the density of the particles in the additive composition is closer to that of the particles of the base material of the litter for which the additive is intended than that of pure SBC or KBC. This has the effect of reducing the tendency of the additive particles to settle to the bottom of the mass of litter in the litter box or cage.

The composition of this invention may also optionally contain a fragrance component. This may be a powdery "fragrance preblend" comprising a pleasant smelling oily liquid or "perfume oil" absorbed on particles of a fragrance carrier having a high surface to volume ratio. The perfume oil may comprise one or more essential or synthetic oils which are well-known in the art as providing a pleasant odor to the composition containing them and also as having the capability of somewhat masking unpleasant odors. The fragrance carrier may be any of a group of siliceous and other materials also well-known in the art as having a high surface to volume ratio and as being able to absorb perfume oils efficiently while maintaining their powdery consistency, e.g., dimorphous silicas or starches. The perfume oil may be present in the fragrance preblend in an amount, for example, of about 25 to 75 wt. % based on the total weight of preblend, and the particle size of fragrance carrier and preblend may be in the range, for example, of about 100 to 400 U.S. mesh size. The fragrance preblend may be present in the final additive composition in an amount, for example, of about 0.5 to 3.0 wt. % based on the weight of the total additive composition.

The fragrance may also be utilized in encapsulated form or as a spray dried component.

The additive composition may also optionally contain zinc oxide (ZnO) which exerts a bactericidal action on the waste products in the litter. Since at least some of the foul odors of urine and fecal matter over a period of time is caused by the bacterial breakdown of the components of such matter, the anti-bacterial action of the ZnO results in a reduction of the generation of such odors. If employed, the ZnO may be present in an amount, for example, of about 5 to 10 wt. % the additive composition and may have a primary (unagglomerated) particle size of about 5 nanometers to 300 microns, preferably about 5 nanometers to 10 microns.

In preparing the compositions of this invention the SBC or KBC and mineral oil are separately blended, e.g., by adding the SBC or KBC to a mixer and spraying the mineral oil into the mixer while the SBC or KBC is being agitated. After all the mineral oil is added, the blending procedure may be continued for a period, for example of about 5 to 20 min. The siliceous material having a relatively low bulk density, e.g., expanded perlite, may then be added to the mixer where it is blended with the SBC or KBC/mineral oil mixture for a period of, for example, about 5 to 20 minutes.

If a fragrance is utilized in the form of a preblend, such preblend may be separately prepared, e.g., by adding a portion of the fragrance carrier to a mixer, initiating spraying of the perfume oil into the mixer while the remainder of the fragrance carrier is added, and continuing blending until a lump-free consistent powder is obtained. The blending period for preparation of the fragrance preblend may be, for example, about 10 to 60 min. The fragrance preblend is then added to the mixture of SBC or KBC, mineral oil and siliceous material, where blending is continued, e.g., for a period of about 5 to 20 min., until the final composition is obtained. If ZnO is employed, it is preferable to add it to the mixture of SBC or KBC, mineral oil and siliceous material before the fragrance.

The foregoing blending procedures may be carried out in any conventional equipment intended for the blending of a particulate solid material with other solid materials or liquids. Examples of suitable equipment are ribbon blenders, V-shell blenders, Marion mixers, and Norda mixers The deodorizing additive compositions of this invention may be used in litters intended for a wide variety of animals and birds, e.g., uncaged household pets such as cats and dogs, particularly puppies too young to be walked, caged pets such as hamsters, gerbils and rabbits, caged laboratory animals such as guinea pigs, mice, rats and monkeys, animals raised for fur such as mink, barnyard birds such as chickens, ducks and geese, and pet birds such as parrots, parakeets, canaries and pigeons.

The animal litters to which the deodorizing additive compositions of this invention may be added include a wide variety of absorbent materials, e.g., cellulose-based materials such as sawdust, wood chips, wood shavings, shredded paper, cellulose staple fibers and shredded cloth and straw; siliceous materials such as sand, clays, foamed or aerated concrete, and calcium silicate; man-made polymeric materials such as porous polymeric beads, foamed plastics, and water-absorbent plastics such as polyacrylates; and water-insoluble inorganic salts such as calcium sulfate. It is possible to precombine any of the foregoing litter materials with the deodorizing additive composition of this invention for sale to the consumer. Moreover, in addition to the deodorizing additive of this invention, the litter may contain other components for various purposes, e.g., disinfectants and colorants.

The deodorizing compositions of this invention are particularly suitable for use in cat litters.

The invention is further by the following examples. All parts are by weight.

EXAMPLE 1

This example shows the preparation of a deodorizing additive composition of this invention which contains no fragrance.

Sodium bicarbonate (SBC) having a purity of over 99% and a particle size in the range of about 40 to 140 U.S. mesh size was charged in an amount of 96 parts to a ribbon blender while 0.5-2.0 parts of mineral oil having a density of about 0.850 g/cc at 15.6° C. and a viscosity of about 12 centistokes at 40° C. was being sprayed into the blender. The charging of the SBC and mineral oil was accomplished in 3½ min. and blending of the two components was continued for another 8 min. Two parts of expanded perlite having a bulk density of about 100 g/l. and a particle size in the range of about 50 to 200 U.S. mesh size was then added to the blender in the course of 2½ min. and blending was continued for 5 additional minutes. The resulting composition was suitable for use as a deodorant in a base animal litter material.

Example 2

This example illustrates the preparation of a deodorizing additive composition containing a fragrance.

A fragrance preblend was prepared by first charging a ribbon blender with 0.3 part of "Sipermat 22" dimorphous silica fragrance carrier and then spraying into the blender 0.6 part of a perfume oil known in the art as having the property of at least partially masking unpleasant odors while adding an additional 0.3 part of fragrance carrier. Blending was continued for one hour from the addition of the perfume oil to obtain a finished fragrance preblend.

The fragrance preblend was then added to the additive composition prepared in another ribbon blender as described in Example 1 and blending was continued for 11 min. to obtain the final composition containing fragrance.

The compositions of both Examples 1 and 2 are particularly suitable for use in cat litters.

I claim:

1. A solid particulate deodorizing additive composition for a water-absorbent animal litter comprising a salt selected from the group consisting of sodium bicarbonate (SBC) and potassium bicarbonate (KBC), the particles of which are substantially coated with a mineral oil, mixed with a powdered siliceous material having a bulk density significantly lower than the density of said salt, said coated particles of said salt being stably adhered t and agglomerated with said particles of siliceous material.

2. The composition of claim 1 comprising sodium bicarbonate.

3. The composition of claim 1 wherein said siliceous material is expanded perlite.

4. The composition of claim 1 also containing a fragrance having the property of at least partially masking unpleasant odors.

5. The composition of claim 1 also containing zinc oxide.

6. The composition of claim 5 wherein said zinc oxide has a primary particle size of about 5 nanometers to 10 microns.

7. The composition of claim 1 wherein said siliceous material has a bulk density of about 50 to 300 g/l.

8. The composition of claim 7 wherein said bulk density is about 70 to 150 g/l.

9. The composition of claim 1 comprising about 80 to 99 wt. % of said salt about 0.1 to 2.0 wt. % of mineral oil, and about 0.5 to 20 wt. % of siliceous material.

10. The composition of claim 9 containing about 92 to 98 wt. % of said salt, about 0.5 to 1.0 wt. % of mineral oil, and about 1 to 5 wt. % of siliceous material.

11. An animal litter comprising a basic water-absorbent litter material and the deodorizing additive composition of claim 1.

12. A method of preparing a solid particulate deodorizing additive composition for a water-absorbent animal litter comprising mixing a slat selected from the group consisting of sodium bicarbonate (SBC) and potassium bicarbonate (KBC) with sufficient mineral oil to substantially coat the particles of said salt while maintaining a solid particulate deodorizing consistency, and blending said coated salt with a siliceous material having a bulk density substantially lower than the density of said salt, to produce a solid particulate composition in which said coated salt particles are stably adhered to and agglomerated with the particles said of siliceous material.

13. The method of claim 12 wherein said additive composition is further mixed with a powdered fragrance preblend prepared by blending a fragrance carrier with a perfume oil

* * * * *